United States Patent
Lee

(10) Patent No.: US 9,637,056 B2
(45) Date of Patent: May 2, 2017

(54) ROTARY SUN VISOR MIRROR FOR VEHICLE

(71) Applicant: Hyundai Motor Company, Seoul (KR)

(72) Inventor: Jae Yong Lee, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 141 days.

(21) Appl. No.: 14/477,634

(22) Filed: Sep. 4, 2014

(65) Prior Publication Data

US 2015/0175076 A1    Jun. 25, 2015

(30) Foreign Application Priority Data

Dec. 19, 2013  (KR) .......................... 10-2013-0158989

(51) Int. Cl.
| | | |
|---|---|---|
| G02B 7/182 | (2006.01) | |
| B60R 1/12 | (2006.01) | |
| B60R 1/04 | (2006.01) | |
| B60J 3/02 | (2006.01) | |

(52) U.S. Cl.
CPC ............... *B60R 1/12* (2013.01); *B60J 3/0282* (2013.01); *B60R 1/04* (2013.01); *G02B 7/1821* (2013.01); *B60R 2001/1269* (2013.01)

(58) Field of Classification Search
CPC ..... B60R 1/04; B60R 1/12; B60R 2001/1238; B60R 2001/1269; G02B 7/1821; B60J 3/0282
USPC ..... 359/840, 844, 872; 296/1.11, 97.2, 97.5; 362/142
See application file for complete search history.

(56) References Cited

U.S. PATENT DOCUMENTS

| | | | | |
|---|---|---|---|---|
| 4,541,663 A | * | 9/1985 | Schwanitz | B60J 3/0282 296/97.5 |
| 4,635,994 A | * | 1/1987 | Dietz | B60J 3/0282 16/361 |
| 4,653,798 A | * | 3/1987 | White | B60J 3/0282 296/97.5 |
| 4,807,093 A | * | 2/1989 | Cisler | B60J 3/0282 296/97.5 |
| 4,934,802 A | * | 6/1990 | Fluharty | G02B 7/1824 248/481 |
| 5,061,004 A | * | 10/1991 | Happich | B60J 3/0282 296/97.5 |
| 6,203,161 B1 | * | 3/2001 | Busch | B60J 3/0282 296/97.1 |
| 6,325,527 B1 | * | 12/2001 | Lee | B60J 3/0282 362/137 |

(Continued)

FOREIGN PATENT DOCUMENTS

| | | | |
|---|---|---|---|
| EP | 0406519 | * | 1/1991 |
| JP | 02-64421 U | | 5/1990 |

(Continued)

*Primary Examiner* — Ricky D Shafer
(74) *Attorney, Agent, or Firm* — Morgan, Lewis & Bockius LLP

(57) ABSTRACT

A rotary sun visor mirror apparatus for a vehicle, may include a mirror housing installed at a side of a sun visor, a mirror assembly accommodated in the mirror housing, a pop-up latch configured to selectively lock the mirror assembly to the mirror housing, and a pop-up device which selectively allows the mirror assembly to pop up from the mirror housing in conjunction with an unlocking operation of the pop-up latch.

6 Claims, 7 Drawing Sheets

(56) References Cited

U.S. PATENT DOCUMENTS

| | | | | |
|---|---|---|---|---|
| 6,669,859 B1* | 12/2003 | Tiesler | ............... | B60J 3/0282 16/297 |
| 8,434,812 B2* | 5/2013 | Li | ...................... | B60R 1/008 296/97.5 |
| 2005/0134078 A1* | 6/2005 | Iwatsuka | ............ | B60J 3/0282 296/97.2 |
| 2015/0258877 A1* | 9/2015 | Lee | .................... | B60J 3/0282 359/844 |

FOREIGN PATENT DOCUMENTS

| | | |
|---|---|---|
| JP | 02-78411 U | 6/1990 |
| JP | 2000-301944 B2 | 10/2000 |
| KR | 10-0156360 B1 | 7/1998 |

* cited by examiner

DIRECTION IN WHICH SPRING
FORCE IS APPLIED

ROTARY SUN VISOR MIRROR FOR VEHICLE

CROSS-REFERENCE TO RELATED APPLICATION

The present application claims priority to Korean Patent Application No. 10-2013-0158989 filed on Dec. 19, 2013, the entire contents of which is incorporated herein for all purposes by this reference.

BACKGROUND

Field of the Invention

The present invention relates to a rotary sun visor mirror for a vehicle, and more particularly, to a sun visor mirror which is installed on a sun visor in an interior room of a vehicle.

Description of Related Art

In general, as a convenient device for blocking intense direct rays from being directly applied to a driver or a passenger, sun visors, which are supported at front upper sides of a driver seat and a front passenger seat using a pivot structure, are installed in an interior room of a vehicle.

As one of the convenient devices for the driver or the passenger, a mirror is attached to a front surface of the sun visor so that a female driver can easily wear or adjust makeup.

Further, a cover, which may be opened and closed, is installed on a front surface portion of the mirror in order to prevent foreign substances from being attached to the mirror, or other objects from being reflected, when the mirror is not used.

Typically, as illustrated in FIG. 1, a sun visor mirror, which is installed in an interior room of a vehicle, includes a sun visor 10 which is installed in the vehicle, a mirror 11 which is attached to one side of a front surface of the sun visor 10, and a cover 12 which covers the mirror 11, and when the cover 12 slides to one side, the mirror 11 is opened such that a driver or a passenger may use the mirror 11 in the interior room of the vehicle.

A growing number of female drivers have favored using the sun visor mirror, they preferred a large-sized sun visor mirror.

However, in the case of the sun visor mirror in the related art, because a sun visor size is fixed depending on a package layout, a mirror size also inevitably has a limited area, and as a result, in case of the current mirror size, a number of complaints are received from female customers because the entire face of a user may not be shown.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a rotary sun visor mirror for a vehicle in which a size of a mirror may be increased in a vertical direction by allowing the mirror to pop up so as to rotate the mirror, and then rotating the mirror in one direction, as necessary.

In an aspect of the present invention, a rotary sun visor mirror apparatus for a vehicle, may include a mirror housing installed at a side of a sun visor, a mirror assembly accommodated in the mirror housing, a pop-up latch configured to selectively lock the mirror assembly to the mirror housing, and a pop-up device which selectively allows the mirror assembly to pop up from the mirror housing in conjunction with an unlocking operation of the pop-up latch.

The pop-up device may include a pop-up base to which the mirror assembly is rotatably assembled, a left pop-up hinge which is rotatably assembled at a side of left and right sides of the pop-up base so as to support a pop-up operation of the pop-up base, a right pop-up hinge which is rotatably assembled at another side of the left and right sides of the pop-up base so as to support the pop-up operation of the pop-up base, a left pop-up spring which is accommodated in a spring accommodating portion that is formed at a side of the left and right sides of the mirror housing, is coupled with a first hinge arm that is formed to protrude at a side of the left pop-up hinge, and is in an extended state, and a right pop-up spring which is accommodated in a spring accommodating portion that is formed at another side of the left and right sides of the mirror housing, is coupled with a second hinge arm that is formed to protrude at a side of the right pop-up hinge, and is an extended state.

The left pop-up hinge may include a first pop-up hinge and a second pop-up hinge which are assembled at both upper and lower sides at the side of the left and right sides of the pop-up base, and the right pop-up hinge may include a third pop-up hinge and a fourth pop-up hinge which are assembled at both upper and lower sides of the another side of the left and right sides of the pop-up base.

The pop-up latch may include a switch fixing groove which is formed at an upper end of the mirror assembly, a pop-up switch which is assembled to a mounting hole that is formed in an upper panel portion of the mirror housing, and may have a side end that is supported in a state in which the side end is inserted into the switch fixing groove, and a switch spring which is assembled in a compressed state between a spring supporting end, which is formed to protrude inside the upper panel portion, and the pop-up switch so as to support the pop-up switch.

Guide slots which each of the first and second hinge arms of each of the pop-up hinges penetrates so as to guide a movement trajectory of each of the left pop-up hinge and the right pop-up hinge when the mirror assembly pops up is formed in the mirror housing.

The mirror assembly includes: a mirror; a mirror frame integrally attached to a rear surface of the mirror; and a rotation supporting portion protruding on a rear surface of the mirror frame and being rotatably assembled to a rotation slot of the pop-up base.

The sun visor mirror according to the present invention has the following advantages.

A size of a mirror in a vertical direction is secured to see the entire face of a user in a simple manner in which the mirror pops up, and thereafter is rotated in one direction, and as a result, there is an advantage in that convenience for the user may be improved.

The size of the mirror in a vertical direction may be increased, as necessary, without changing a size of a sun visor depending on a package layout.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
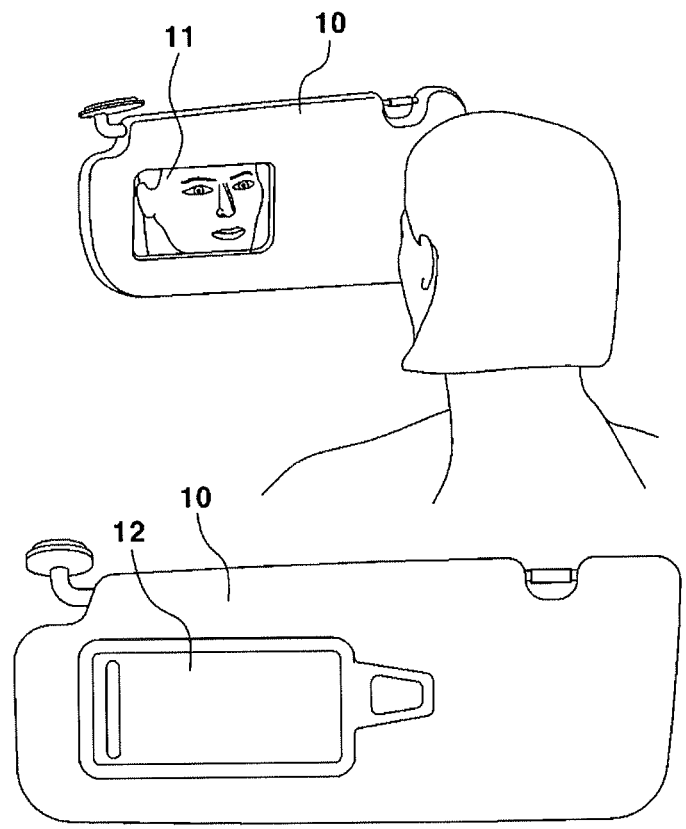
FIG. 1 is a view illustrating a sun visor mirror in the related art.

Reference numerals set forth in the Drawings include reference to the following elements as further discussed below:

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described with reference to the accompanying drawings so that those skilled in the Field of the Invention to which the present invention pertains may carry out the exemplary embodiment.

The present invention relates to a rotary sun visor mirror using a pop-up structure, and may increase a mirror size in a vertical direction by allowing a mirror to protrude forward using a pop-up operation so as to secure a space for rotating the mirror, and then rotating the mirror in one direction.

Figure 2:
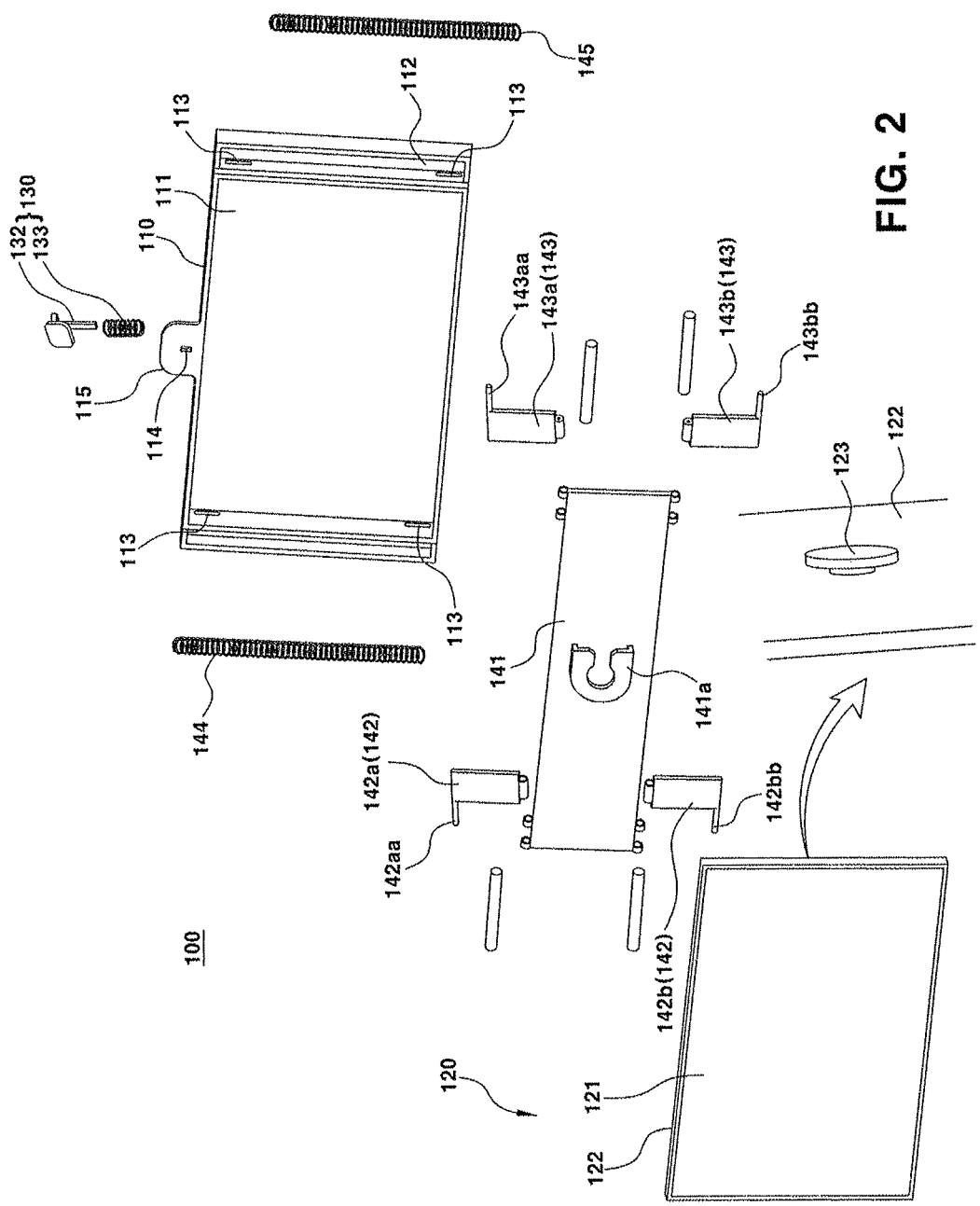
FIG. 2 is an exploded perspective view for explaining a configuration of a sun visor mirror according to an exemplary embodiment of the present invention.

As illustrated in FIG. 2, a sun visor mirror 100 according to an exemplary embodiment of the present invention includes a mirror housing 110, a mirror assembly 120, a pop-up latch 130, and a pop-up device.

The mirror housing 110 is mounted at one side of a rear surface of a sun visor 200, and has a space portion 111 for accommodating the mirror assembly 120 and the pop-up device, spring accommodating portions 112 are formed at both left and right sides of the space portion 111, guide slots 113 are formed at both upper and lower sides of each side which partitions the space portion 111 and the spring accommodating portion 112, and an upper panel portion 115, which has a mounting hole 114 for assembling a pop-up switch 132 that will be described below, is formed to protrude at an upper side of the space portion 111.

Figure 3:
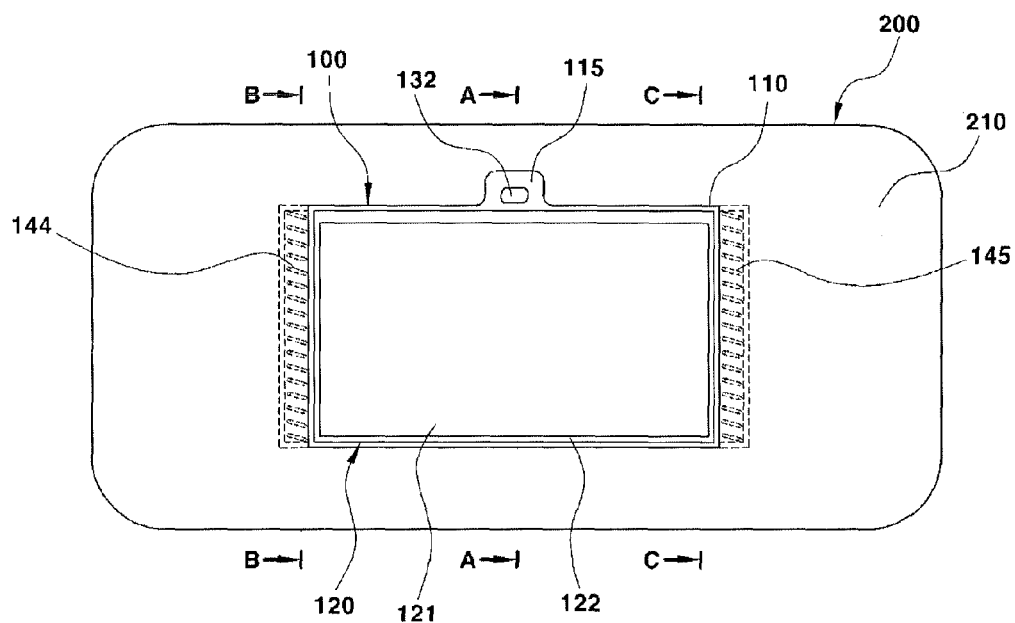
FIG. 3 is a view illustrating a state in which the sun visor mirror according to the exemplary embodiment of the present invention is mounted on a sun visor.
Figure 5:
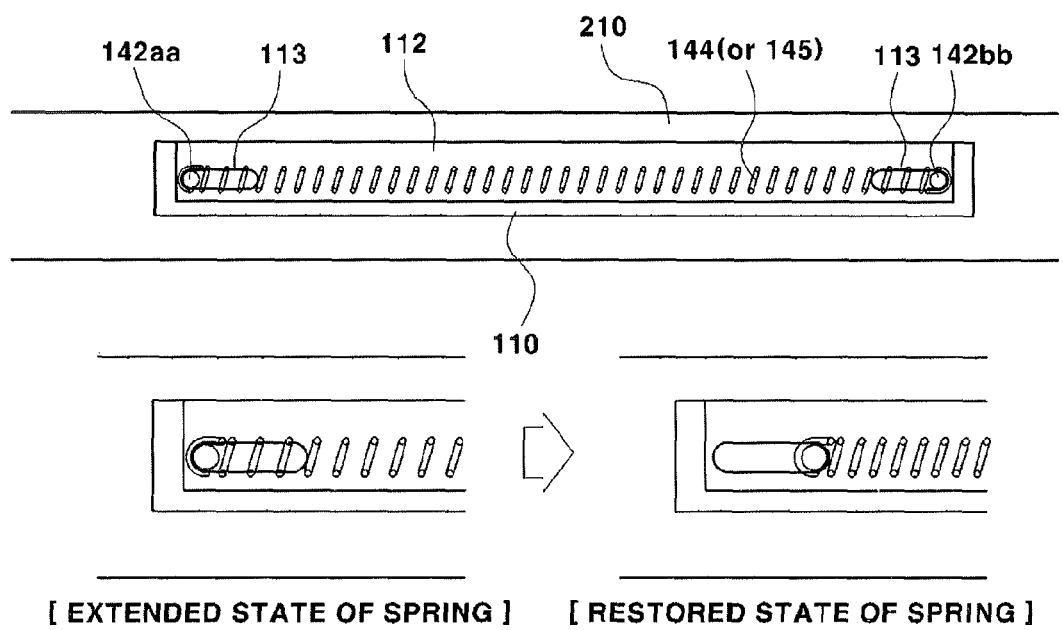
FIG. 5 is a cross-sectional view taken along lines A-A, B-B, and C-C of FIG. 3, for explaining an assembly structure of the sun visor mirror according to the exemplary embodiment of the present invention.

As illustrated in FIGS. 3 and 5, in the present exemplary embodiment, the spring accommodating portion 112 is covered by a rear panel 210 of the sun visor when the sun visor mirror 100 is mounted on the rear surface of the sun visor 200.

The mirror assembly 120 is installed to be accommodated in the space portion 111 of the mirror housing 110, and includes a mirror 121 having a plate shape, and a mirror frame 122 integrally attached to a rear surface of the mirror 121, and the mirror frame 122 is formed in a shape that encloses the rear surface and a side surface of the mirror 121.

Further, a rotation supporting portion 123, which is rotatably assembled to a rotation slot 141a of a pop-up base 141 which will be described below, is formed to protrude on a rear surface of the mirror frame 122.

Figure 4:
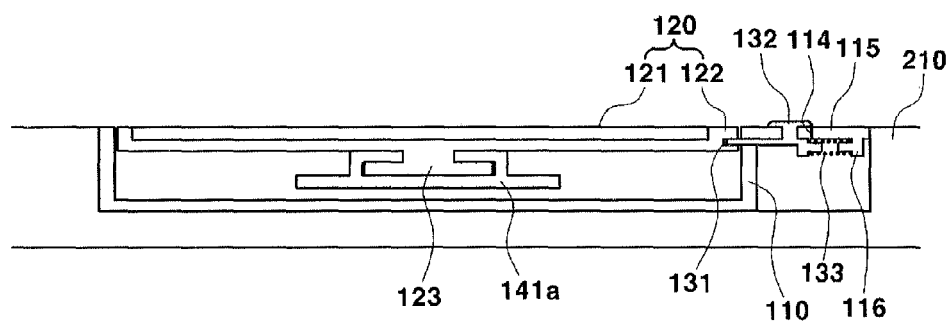
FIG. 4 is a cross-sectional view taken along lines A-A, B-B, and C-C of FIG. 3, for explaining an assembly structure of the sun visor mirror according to the exemplary embodiment of the present invention.
Figure 6:
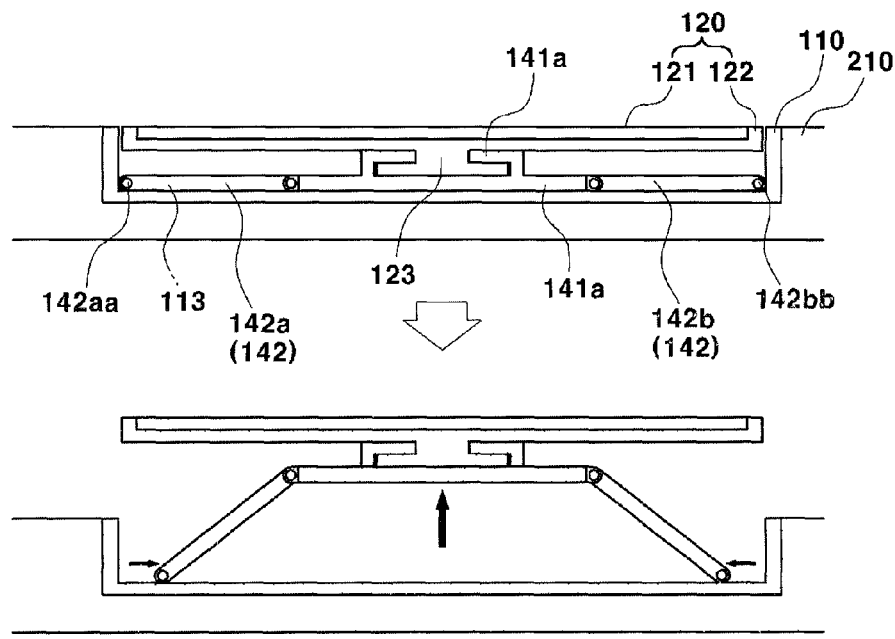
FIG. 6 is a cross-sectional view taken along lines A-A, B-B, and C-C of FIG. 3, for explaining an assembly structure of the sun visor mirror according to the exemplary embodiment of the present invention.

FIG. 3 is a view illustrating a state in which the sun visor mirror to which the constituent elements illustrated in FIG. 2 are mounted on the sun visor, and FIGS. 4 to 6 are cross-sectional views taken along lines A-A, B-B, and C-C of FIG. 3, and illustrate an assembly structure of the sun visor mirror.

The pop-up latch 130 serves to lock and unlock a pop-up operation of the mirror assembly 120, and includes a switch fixing groove 131 which is formed to be recessed at an upper end of the mirror frame 122, a pop-up switch 132 which is assembled to a mounting hole 114 that is formed at an upper side of the mirror housing 110, and a switch spring 133 which is assembled at an upper side of the pop-up switch 132 in a compressed state.

The switch fixing groove 131 serves to catch and fix the pop-up switch 132, and as illustrated in FIG. 4, the pop-up switch 132 is assembled to the mounting hole 114 of the mirror housing 110, and at the same time, one side end of the pop-up switch 132 is inserted into and caught by the switch fixing groove 131.

In this case, the one side end of the pop-up switch 132 penetrates an upper end of the mirror housing 110, and enters the switch fixing groove 131.

When the pop-up switch 132 is assembled to the mounting hole 114, the pop-up switch 132 is assembled to the mounting hole 114 so that the pop-up switch 132 is movable in one direction, and is moved by being pushed in the one direction by an operation of a user such that the pop-up switch 132 is unlocked from the mirror frame 122.

The switch spring 133 presses the pop-up switch 132 in one direction using elastic restoring force that is produced when the switch spring 133 is compressed, thereby fixing the pop-up switch 132 in a state in which the one side end of the pop-up switch 132 is inserted into the switch fixing groove 131, and the switch spring 133 is installed between the pop-up switch 132 and a spring supporting end 116 in a compressed state.

As illustrated in FIG. 4, the spring supporting end 116 is formed to protrude inward from the upper panel portion 115 of the mirror housing 110 which has the mounting hole 114, and disposed at an upper side of the mounting hole 114.

When the pop-up latch 130 is unlocked, that is, when the mirror assembly 120 is unlocked, the pop-up device allows the mirror assembly 120 to pop up in conjunction with an unlocking operation of the pop-up latch 130, and as illustrated in FIG. 2, includes the pop-up base 141, a left pop-up hinge 142, a right pop-up hinge 143, a left pop-up spring 144, and a right pop-up spring 145.

The pop-up base 141 is rotatably assembled to a rear surface of the mirror assembly 120, in other words, the mirror assembly 120 is assembled to be rotatable through the rotation supporting portion 123 of the rear surface of the mirror assembly 120, and the rotation slot 141a to which the rotation supporting portion 123 is rotatably assembled is formed to protrude on one surface of the pop-up base 141.

The left pop-up hinge 142 and the right pop-up hinge 143 are rotatably assembled to both left and right sides of the pop-up base 141 using a pin-fastening structure (a fastening structure using a hinge pin).

The left pop-up hinge 142 includes a first pop-up hinge 142a and a second pop-up hinge 142b which are assembled at both upper and lower sides at one side of left and right sides of the pop-up base 141, and the right pop-up hinge 143 includes a third pop-up hinge 143a and a fourth pop-up hinge 143b which are assembled at both upper and lower sides at another side of left and right sides of the pop-up base 141.

The first pop-up hinge 142a is rotatably assembled at a left upper end of the pop-up base 141, the second pop-up hinge 142b is rotatably assembled at a left lower end of the pop-up base 141, the third pop-up hinge 143a is rotatably assembled at a right upper end of the pop-up base 141, as illustrated in FIG. 6, and the fourth pop-up hinge 143b is rotatably assembled at a right lower end of the pop-up base 141.

In this case, the respective pop-up hinges 142a, 142b, 143a, and 143b have hinge arms 142aa, 142bb, 143aa, and 143bb each of which has a thin pin shape and protrudes at a predetermined length on one side edge of each of the respective pop-up hinges 142a, 142b, 143a, and 143b, and each of the hinge arms 142aa, 142bb, 143aa, and 143bb penetrates the guide slot 113 of the mirror housing 110, and is attached and integrally connected to one side end of each the left pop-up spring 144 and the right pop-up spring 145.

The guide slot 113 guides a movement trajectory of each of the pop-up hinges 142a, 142b, 143a, and 143b when the mirror assembly 120 pops up, and each of the pop-up hinges 142a, 142b, 143a, and 143b is moved along the guide slot 113 simultaneously with restoration of the left and right pop-up springs 144 and 145, thereby enabling pop-up operations of the mirror assembly 120 and the pop-up base 141.

Referring to FIG. 5, the respective pop-up springs 144 and 145 are coupled with the respective pop-up hinges 142 and 143 in the spring accommodating portion 112 of the mirror housing 110 in a state in which the pop-up springs 144 and 145 are extended to a certain degree, and are restored to original states while being compressed by elastic restoring force simultaneously when the pop-up latch 130 unlocks the mirror assembly 120.

That is, in a state in which the mirror assembly 120 is fixedly accommodated and locked in the space portion 111 of the mirror housing 110, each of the pop-up springs 144 and 145 maintains an extended state in which elastic restoring force is produced, and the pop-up springs 144 and 145 are restored simultaneously with the unlocking operation of the mirror assembly 120, and then each of the pop-up hinges 142 and 143 is moved along a trajectory of the guide slot 113, thereby performing the pop-up operation of the mirror assembly 120.

According to the pop-up device, the left pop-up hinge 142 is rotatably assembled at one side of left and right sides of the pop-up base 141, and the right pop-up hinge 143 is rotatably assembled at another side of the left and right sides of the pop-up base 141, thereby supporting the pop-up operation of the pop-up base 141, and each of the hinge arms 142aa, 142bb, 143aa, and 143bb of each of the first to fourth pop-up hinges 142a, 142b, 143a, and 143b penetrates the guide slot 113 of the mirror housing 110 so as to be coupled to one side end of each of the pop-up springs 144 and 145, thereby enabling the pop-up operation by elastic restoring force of the pop-up springs 144 and 145 simultaneously with the unlocking operation of the pop-up latch 130.

Figure 7:
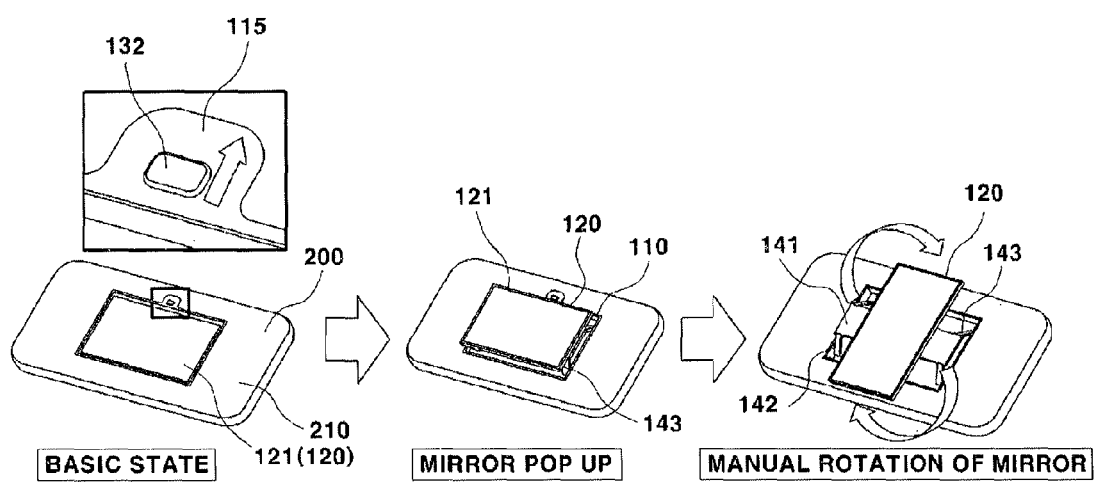
FIG. 7 is a view for explaining an operational state of the sun visor mirror according to the exemplary embodiment of the present invention.
Figure 8:
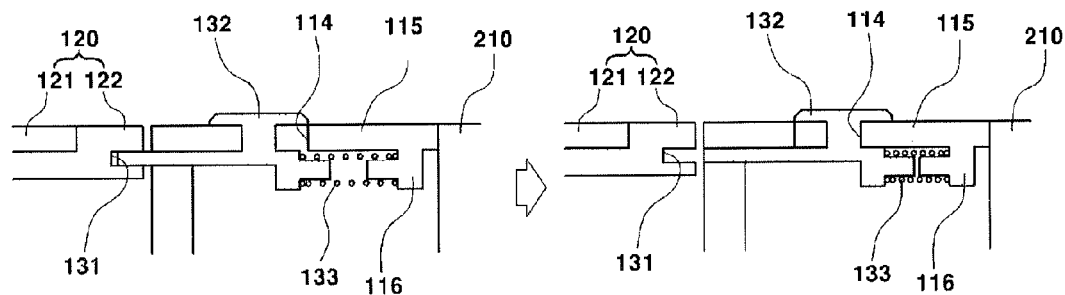
FIG. 8 is a view for explaining an operational state of the sun visor mirror according to the exemplary embodiment of the present invention.
Figure 9:
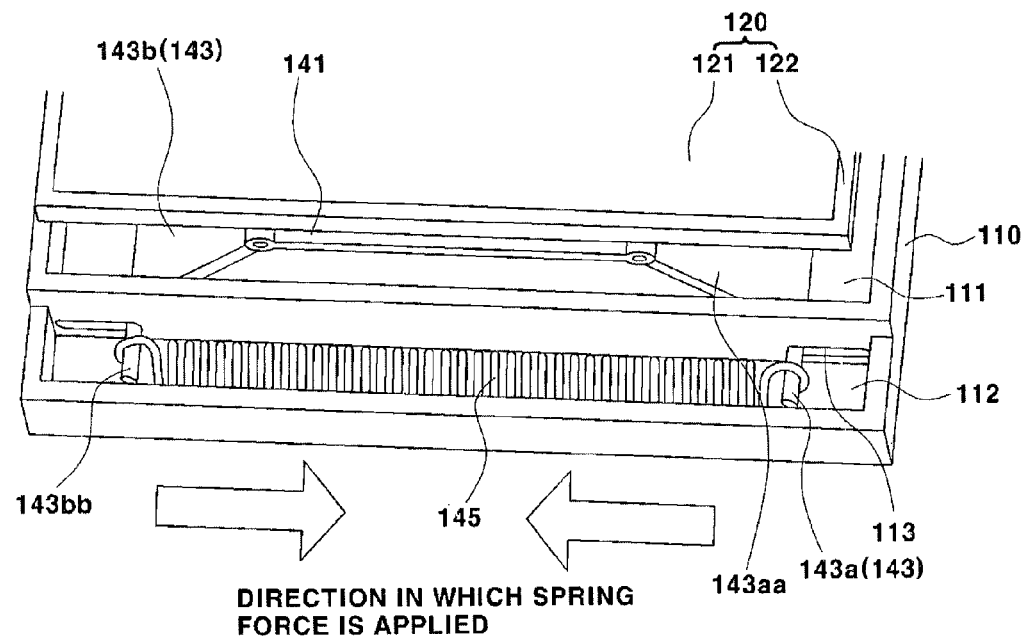
FIG. 9 is a view for explaining an operational state of the sun visor mirror according to the exemplary embodiment of the present invention.

FIGS. 7 to 9 are views for explaining an operational state of the sun visor mirror according to the exemplary embodiment of the present invention.

As illustrated in FIGS. 7 to 9, when the user pushes up the pop-up switch 132 upward, the mirror assembly 120 is unlocked, and the mirror assembly 120 pops up forward from the mirror housing 110 while elastic restoring force of the pop-up springs 144 and 145 is applied, such that the mirror assembly 120 is rotatable, and in this case, the user manually rotates the mirror assembly 120 which pops up.

Figure 10:
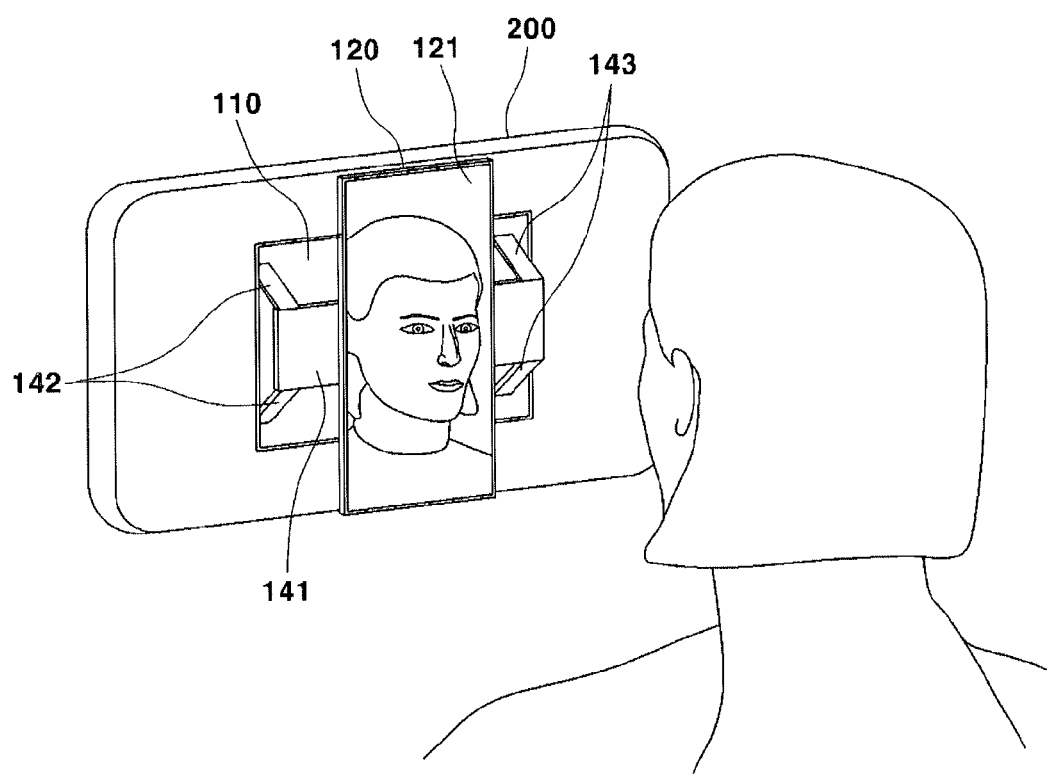
FIG. 10 is a view illustrating a usage example of the sun visor mirror according to the exemplary embodiment of the present invention.

As illustrated in FIG. 10, the user then may secure a mirror size that is increased in a vertical direction, and may see the entire face at a look.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A rotary sun visor mirror apparatus for a vehicle, comprising:
   a mirror housing installed at a side of a sun visor;
   a mirror assembly fixedly accommodated and locked in the mirror housing;
   a pop-up latch configured to selectively lock the mirror assembly to the mirror housing; and
   a pop-up device which selectively allows the mirror assembly to pop up from the mirror housing in conjunction with an unlocking operation of the pop-up latch,
   wherein the pop-up device includes a pop-up base to which the mirror assembly is rotatably assembled,
   wherein the pop-up base and the mirror assembly pop up from the mirror housing when the mirror assembly is unlocked by the unlocking operation of the pop-up latch, such that the mirror assembly is rotatable, and
   wherein the pop-up device further includes:
      a left pop-up hinge which is rotatably assembled at a side of left and right sides of the pop-up base so as to support a pop-up operation of the pop-up base;
      a right pop-up hinge which is rotatably assembled at another side of the left and right sides of the pop-up base so as to support the pop-up operation of the pop-up base;
      a left pop-up spring which is accommodated in a spring accommodating portion that is formed at a side of the left and right sides of the mirror housing, is coupled with a first hinge arm that is formed to protrude at a side of the left pop-up hinge, and is in an extended state; and
      a right pop-up spring which is accommodated in a spring accommodating portion that is formed at another side of the left and right sides of the mirror housing, is coupled with a second hinge arm that is formed to protrude at a side of the right pop-up hinge, and is an extended state.

2. The rotary sun visor mirror apparatus of claim 1, wherein the left pop-up hinge includes a first pop-up hinge and a second pop-up hinge which are assembled at both upper and lower sides at the side of the left and right sides of the pop-up base, and
wherein the right pop-up hinge includes a third pop-up hinge and a fourth pop-up hinge which are assembled at both upper and lower sides of the another side of the left and right sides of the pop-up base.

3. The rotary sun visor mirror apparatus of claim 1, wherein the pop-up latch includes:
   a switch fixing groove which is formed at an upper end of the mirror assembly;
   a pop-up switch which is assembled to a mounting hole that is formed in an upper panel portion of the mirror housing, and has a side end that is supported in a state in which the side end is inserted into the switch fixing groove; and
   a switch spring which is assembled in a compressed state between a spring supporting end, which is formed to protrude inside the upper panel portion, and the pop-up switch so as to support the pop-up switch.

4. The rotary sun visor mirror apparatus of claim 1, wherein guide slots which each of the first and second hinge arms of each of the pop-up hinges penetrates so as to guide a movement trajectory of each of the left pop-up hinge and the right pop-up hinge when the mirror assembly pops up is formed in the mirror housing.

5. The rotary sun visor mirror apparatus of claim 1, wherein the mirror assembly includes:
   a mirror;
   a mirror frame integrally attached to a rear surface of the mirror; and
   a rotation supporting portion protruding on a rear surface of the mirror frame and being rotatably assembled to a rotation slot of the pop-up base.

6. A rotary sun visor mirror apparatus for a vehicle, comprising:
   a mirror housing installed at a side of a sun visor;
   a mirror assembly fixedly accommodated and locked in the mirror housing;
   a pop-up latch configured to selectively lock the mirror assembly to the mirror housing; and
   a pop-up device which selectively allows the mirror assembly to pop up from the mirror housing in conjunction with an unlocking operation of the pop-up latch,
   wherein the pop-up device includes a pop-up base to which the mirror assembly is rotatably assembled,
   wherein the pop-up base and the mirror assembly pop up from the mirror housing when the mirror assembly is unlocked by the unlocking operation of the pop-up latch, such that the mirror assembly is rotatable, and
   wherein the mirror assembly includes:
      a mirror;
      a mirror frame integrally attached to a rear surface of the mirror; and
      a rotation supporting portion protruding on a rear surface of the mirror frame and being rotatably assembled to a rotation slot of the pop-up base.

* * * * *